Patented Feb. 16, 1943

2,311,615

UNITED STATES PATENT OFFICE 2,311,615

METHOD OF MAKING POLYMERS DERIVED FROM STYRENE

John W. Zemba and Gerald H. Coleman, Midland, Mich., assignors to The Dow Chemical Company, Midland, Mich., a corporation of Michigan No Drawing. Application March 27, 1940, Serial No. 326,174

8 Claims. (Cl. 260—78)

This invention concerns an improved method of making substantially insoluble and non-swelling polymers derived from styrene.

In the co-pending application of Britton, Marshall, and LeFevre, Serial No. 324,230, filed March 15, 1940, are described certain new polymeric products which are prepared by polymerizing styrene in the presence of certain other unsaturated organic compounds. These products are characterized by being substantially insoluble and non-swelling in common organic solvents such as benzene, toluene, ethanol, acetone, carbon tetrachloride, ethyl acetate, etc. They are further characterized by their opaque, white appearance and their friable, porous structure, and accordingly are clearly differentiated from the hard, tough, glass-like insoluble styrene co-polymers known heretofore. Because of their characteristic appearance and feel these products have become known as "popcorn" polymers. For convenience, these polymeric products are referred to herein as co-polymers of styrene, although, as stated in the above-mentioned application, they may be a new form of polystyrene itself.

According to said co-pending application, such copolymers are preferably prepared by polymerizing at a temperature below about 110° C. a mixture of styrene and an unsaturated ester co-polymerizing agent containing at least two

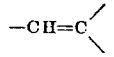

groups, although other unsaturated co-polymerizing agents, such as divinyl benzene and butadiene, may be employed. Examples of such unsaturated esters include diallyl maleate, allyl cinnamate, diallyl oxalate, di-(2-chloroallyl) adipate, trimethallyl phosphate, diallyl fumarate, ethylene dicinnamate, 2-chloroallyl furoate, the dicinnamate of 1,4-dioxanediol-2,3, methallyl cinnamate, allyl methacrylate, ethylallyl vinylacetate, 2-chloroallyl crotonate, methallyl acryate, etc. The product obtained by operating in this manner is an opaque, white, porous mass, having associated therewith more or less of a transparent, glass-like resin which is capable of being swelled in benzene and similar hydrocarbon solvents. The proportions in which the two types of polymers are formed depend upon a number of factors, including the particular co-polymerizing agent employed, the conditions under which the co-polymerization is carried out, etc. Ordinarily, however, the two types of co-polymer are formed in about equal proportions, although in some instances higher yields of the desired insoluble and non-swelling type of co-polymer have been obtained.

We have now found that the proportion of the friable, white, insoluble and non-swelling product formed during the co-polymerization may be greatly increased by carrying out the co-polymerization in the presence of a small amount of a similar co-polymer obtained from a previous co-polymerization. Although the mechanism of the reaction is not known, the presence of a small amount of a non-swelling co-polymer during the co-polymerization appears to induce the formation of the non-swelling type of product in much the same manner as crystallization is induced by the presence of a crystal seed. However, the present process differs from crystal seeding in that it is not necessary that the seed and the product being seeded be identical. For example, a "seed" of the opaque, white, non-swelling co-polymer of styrene and diallyl maleate may be employed according to the invention to increase the yield of the opaque, white non-swelling co-polymer of styrene and trimethallyl phosphate.

We have also found that styrene alone may be polymerized in the presence of a non-swelling co-polymer "seed" to form a friable, white, substantially insoluble and nonswelling polymer, which for all practical purposes is identical with the non-swelling co-polymer prepared by co-polymerizing styrene and an unsaturated co-polymerizing agent.

In preparing the substantially insoluble and nonswelling co-polymers of styrene according to the present invention, styrene, or a mixture of styrene and a suitable co-polymerizing agent, preferably an unsaturated ester containing at least two

groups, is polymerized by heating at a temperature below about 110° C., preferably at 50°–80° C., in the presence of 0.1–5.0 per cent by weight of the co-polymer "seed." The co-polymerizing agent is usually employed in an amount between about 1.0 and about 25.0 per cent by weight of the styrene, although other proportions may be employed. A preferred group of unsaturated ester co-polymerizing agents consists of the allyl, 2-chloroallyl, and methallyl esters of low molecular weight mono- or poly-carboxylic acids, such as maleic acid, oxalic acid, fumaric acid, methacrylic acid, cinnamic acid, etc., although more complex esters of higher molecular weight may be employed if desired.

The opaque, white substantially insoluble and non-swelling co-polymer which is employed as "seed" is preferably prepared by polymerizing a mixture of styrene and about 10 per cent by weight of diallyl maleate at a temperature of 80°–100° C. for six or seven days. The product obtained is ground, extracted with acetone to remove any unreacted diallyl maleate, and dried. However, any other co-polymer of the present type may be employed as "seed," the diallyl maleate co-ploymer being preferred simply for reasons of economy and convenience.

The product obtained by polymerizing styrene or a mixture of styrene and a co-polymerizing agent as hereinbefore described consists of a friable, white, porous mass resembling a mass of cotton linters in appearance and having associated therewith only a relatively small amount, if any, of the tough, glass-like type of co-polymer which is soluble or capable of being swelled in benzene and similar aromatic hydrocarbon solvents. In some cases, however, as for example when the styrene and/or co-polymerizing agent contain impurities which inhibit co-polymerization, or when the co-polymerization is carried out at a temperature only slightly below 110° C., the polymerized mass may contain a substantial quantity of the glass-like, swelling type of co-polymer associated with the opaque, white, non-swelling product. Such mixed product may be employed directly in making molded articles, but it is usually desirable to separate the two types of material. Such separation may be effected by causing the glass-like material to swell to a thin gel in a large amount of benzene or other suitable solvent and thereafter decanting or straining the gel from the non-swelling material. The latter may then be washed with the solvent, dried, and obtained as a friable, white material resembling bleached wood pulp in appearance. This material may then be ground to form a molding powder. When ground to a fine powder, the non-swelling co-polymer has the appearance of powdered sugar or starch and has a peculiar elastic feel when rubbed between the fingers. The two types of co-polymers may also be separated by a differential grinding process, whereby advantage is taken of the ease with which the non-swelling product may be pulverized.

The following examples will illustrate a number of ways in which the principle of our invention may be employed, but are not to be construed as limiting the same:

EXAMPLE 1

One kilogram of styrene is "seeded" with one gram of the opaque, white co-polymer of styrene and diallyl maleate and is polymerized by heating at a temperature of 50° C. for seven days. The polymerized product consists of a fluffy, white mass having interspersed therethrough a small amount of a transparent, glass-like resin which is capable of being swelled in benzene. The opaque, white material is insoluble and non-swelling in benzene. The co-polymer "seed" employed in this preparation is prepared by co-polymerizing 100 parts of styrene with 10 parts of diallyl maleate at 100° C. for 168 hours and thereafter extracting the opaque, white co-polymer product with acetone.

EXAMPLE 2

A mixture of 25 parts of styrene and 1 part of trimethallyl phosphate is "seeded" with 0.15 part of the non-swelling co-polymer of styrene and diallyl maleate prepared as in Example 1. The "seeded" mixture is polymerized by heating at 60° C. for 96 hours to obtain a slightly moist, opaque, white mass which is extracted with acetone, ground, and dried in a vacuum oven. A molded test specimen of this product has a tensile strength of approximately 7500 lbs./sq. in., a heat distortion value of 80° C., and a Shore Scleroscope hardness of 84. The product prepared by polymerizing such a mixture of styrene and trimethallyl phosphate under identical conditions but in the absence of a "seed" contains very little non-swelling polymer and consists almost entirely of the glass-like type of product which is capable of being swelled.

EXAMPLE 3

A mixture of 200 parts of styrene and 1 part of the dicinnamate of 1.4-dioxanediol-2.3 is "seeded" with 1 part of the non-swelling co-polymer of styrene and diallyl fumarate. The "seeded" mixture is polymerized by heating at 80° C. for seven days whereby there is obtained a polymerized mass containing about equal parts of the two types of polymers. The opaque, white co-polymer is separated from the glass-like co-polymer and is ground and dried. A molded test specimen has an impact strength of about 1.0 in. lb., a heat distortion value of 84° C., and a softening point of 130° C.

EXAMPLE 4

The following table presents data illustrating the use of a co-polymer "seed" in preparing different non-swelling styrene co-polymers. In each case, a mixture of monomeric styrene and the co-polymerizing agent, in the proportions indicated, is polymerized under the conditions stated, and in the presence or absence of a co-polymer "seed," as indicated. The co-polymer "seed" employed is the same styrene-diallyl maleate co-polymer employed as "seed" in Example 1. The last column in the table shows the approximate proportion of opaque, white, non-swelling co-polymer present in the entire polymerized mass.

Table

| Exp't No. | Styrene parts | Co-polymerizing agent Name | Parts | "Seed" Parts | Polymerization Temp. °C. | Time Hours | Proportion of non-swelling co-polymer Per cent |
|---|---|---|---|---|---|---|---|
| 1 | 200 | Diallyl fumerate | 4.0 | 1.0 | 80 | 168 | 98 |
| 2 | 200 | ...do... | 4.0 | | 80 | 168 | 25 |
| 3 | 200 | Di-(2-chloroallyl) oxalate | 4.0 | 1.0 | 80 | 168 | 60 |
| 4 | 200 | ...do... | 4.0 | | 80 | 168 | 5 |
| 5 | 200 | 2-chloroallyl crotonate | 4.0 | 1.0 | 80 | 168 | 75 |
| 6 | 200 | ...do... | 4.0 | | 80 | 168 | 5 |
| 7 | 200 | Ethylene dicinnamate | 4.0 | 1.0 | 80 | 168 | 90 |
| 8 | 200 | ...do... | 4.0 | | 80 | 168 | 5 |
| 9 | 250 | Dicinnamate of 1.4-dioxanediol-2.3 | 1.25 | 1.0 | 60 | 96 | 98 |
| 10 | 250 | ...do... | 1.25 | | 60 | 96 | 15 |
| 11 | 250 | Trimethallyl phosphate | 10.0 | 1.0 | 60 | 96 | 98 |
| 12 | 250 | ...do... | 10.0 | | 60 | 96 | 5 |

EXAMPLE 5

200 parts of monomeric styrene is "seeded" with 1.0 part of a non-swelling co-polymer prepared by co-polymerizing styrene and 10 per cent by weight of 2-chloroallyl crotonate at 80° C. for 168 hours. The "seeded" styrene is then polymerized by heating at 80° C. for 336 hours. The polymerized mass contains about 20 per cent by volume of the opaque, white, non-swelling type of co-polymer, the remainder being the transparent, resinous type.

EXAMPLE 6

A mixture of 200 parts of styrene and 1.0 part of the dicinnamate of 1.4-dioxanediol-2.3 is "seeded" with 1.2 parts of the opaque, white, non-swelling co-polymer of styrene and diallyl maleate, and is polymerized by heating at 60° C. for 96 hours. The product consists of a swollen, white mass having interspersed therethrough a small amount of the glass-like type of co-polymer. A molded test specimen has a tensile strength of about 7300 lbs./sq. in., a dielectric constant of about 2.8, a power factor of 0.03 per cent, and an impact strength of 0.9 in. lb.

EXAMPLE 7

4 parts of a non-swelling, mixed co-polymer of styrene, the dicinnamate of 1.4-dioxanediol-2.3, and 2-chloroallyl cinnamate are employed as "seed" in a polymerization of 200 parts of styrene carried out at 80° C. for 336 hours. The polymerized mass contains approximately 15 per cent of opaque, white, non-swelling co-polymer.

This application is a continuation-in-part of our co-pending application, Serial No. 217,226, filed July 2, 1938.

Other modes of applying the principle of our invention may be employed instead of those explained, change being made as regards the method herein disclosed, provided the step stated by any of the following claims or the equivalent of such stated step be employed.

We therefore particularly point out and distinctly claim as our invention:

1. In the process of polymerizing at a temperature below about 110° C. a mixture of styrene and a neutral unsaturated ester containing at least two olefinic linkages, the step which consists in starting the polymerization in the presence of a small proportion of a friable, opaque polymeric material which is substantially insoluble and non-swelling in benzene and which has been made by the polymerization of a mixture of styrene and a compound containing at least two olefinic linkages at a temperature below about 110° C.; whereby a further quantity of friable, opaque, substantially colorless polymeric material which is substantially insoluble and non-swelling in benzene is formed.

2. In the process of polymerizing at a temperature below about 110° C. a mixture of styrene and a neutral unsaturated ester containing at least two olefinic linkages, the step which consists in starting the polymerization in the presence of a small proportion of a friable, opaque polymeric material which is substantially insoluble and non-swelling in benzene and which has been made by the polymerization of a mixture of styrene and a neutral ester containing at least two olefinic linkages at a temperature below about 110° C.; whereby a further quantity of friable, opaque, substantially colorless polymeric material which is substantially insoluble and non-swelling in benzene is formed.

3. In the process of polymerizing at a temperature below about 110° C. a mixture of styrene and a neutral unsaturated ester containing at least two olefinic linkages, the step which consists in starting the polymerization in the presence of a small proportion of a friable, opaque polymeric material which is substantially insoluble and non-swelling in benzene and which has been made by the polymerization of a mixture of styrene and diallyl maleate at a temperature below about 110° C.; whereby a further quantity of friable, opaque, substantially colorless polymeric material which is substantially insoluble and non-swelling in benzene is formed.

4. In the process of polymerizing styrene at a temperature below about 110° C., the step which consists in starting the polymerization in the presence of a small proportion of a friable, opaque polymeric material which is substantially insoluble and non-swelling in benzene and which has been made by the polymerization of a mixture of styrene and a neutral unsaturated ester containing at least two olefinic linkages at a temperature below about 110° C.; whereby a further quantity of friable, opaque, substantially colorless polymeric material which is substantially insoluble and non-swelling in benzene is formed.

5. In the process of polymerizing styrene at a temperature below about 110° C., the step which consists in starting the polymerization in the presence of a small proportion of a friable, opaque polymeric material which is substantially insoluble and non-swelling in benzene and which has been made by the polymerization of a mixture of styrene and diallyl maleate at a temperature below about 110° C.; whereby a further quantity of friable, opaque, substantially colorless polymeric material which is substantially insoluble and non-swelling in benzene is formed.

6. In a method wherein a friable, opaque polymeric product which is substantially insoluble in and substantially non-swellable by benzene is prepared by polymerizing styrene together with a minor proportion of a polyolefinic organic compound at a temperature below 110° C., the step of forming a further quantity of such product by polymerizing styrene at a temperature below 110° C. in the presence of a minor proportion of said friable, opaque polymeric product from the first of said polymerizations.

7. In a method wherein a friable, opaque polymeric product which is substantially insoluble in and substantially non-swellable by benzene is prepared by polymerizing styrene together with a minor portion of a polyolefinic organic compound at a temperature below 110° C., the step of forming a further quantity of such product by polymerizing styrene at a temperature below 110° C. in the presence of both a minor portion of a polyolefinic organic compound and small proportion of the friable, opaque polymeric product from the first of said polymerizations.

8. In a method wherein a friable, opaque polymeric product which is substantially insoluble in and substantially non-swellable by benzene is prepared by polymerizing at a temperature below 110° C. styrene together with a minor portion of a neutral unsaturated ester containing at least two olefinic linkages in the molecule, the step of forming a further quantity of such product by polymerizing styrene at a temperature below 110° C. in the presence of a small proportion of the friable-opaque polymeric product from the first of said polymerizations.

JOHN W. ZEMBA.
GERALD H. COLEMAN.